United States Patent
Bottari et al.

(10) Patent No.: US 9,768,904 B2
(45) Date of Patent: Sep. 19, 2017

(54) METHOD AND APPARATUS FOR ALLOCATING SLOTS FOR TRANSMISSION OF DATA

(75) Inventors: Giulio Bottari, Leghorn (IT); Piero Castoldi, Vicopisano (IT); Filippo Cugini, Fidenza (IT); Paola Iovanna, Rome (IT); Nicola Sambo, Leghorn (IT)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 305 days.

(21) Appl. No.: 14/345,020

(22) PCT Filed: Dec. 7, 2011

(86) PCT No.: PCT/EP2011/072117
§ 371 (c)(1),
(2), (4) Date: Jan. 8, 2015

(87) PCT Pub. No.: WO2013/037429
PCT Pub. Date: Mar. 21, 2013

(65) Prior Publication Data
US 2015/0139652 A1 May 21, 2015

(30) Foreign Application Priority Data
Sep. 16, 2011 (EP) .................... 11181653

(51) Int. Cl.
*H04J 14/02* (2006.01)

(52) U.S. Cl.
CPC ........ *H04J 14/023* (2013.01); *H04J 14/0256* (2013.01); *H04J 14/0257* (2013.01); *H04J 14/0258* (2013.01)

(58) Field of Classification Search
None
See application file for complete search history.

(56) References Cited

U.S. PATENT DOCUMENTS

| 4,429,383 A * | 1/1984 | Finck ................ H04J 3/1629 370/358 |
| 6,275,506 B1 * | 8/2001 | Fazel ................ H04J 4/00 370/459 |

(Continued)

OTHER PUBLICATIONS

Pfau, "Hardware requirements for coherent systems beyond 100G. DSP & FEC: Towards the Shannon Limit", Alcatel Lucent, Sep. 20, 2009, 10 pages.

(Continued)

*Primary Examiner* — David Payne
*Assistant Examiner* — Casey Kretzer
(74) *Attorney, Agent, or Firm* — Rothwell, Figg, Ernst & Manbeck, P.C.

(57) ABSTRACT

Slots (311) for transmission of data of a particular transmission type over an optical network are allocated by selecting a first available slot (313_2) at an ordinal position corresponding to a multiple of n and allocating the selected first available slot and the next n−1 consecutive slots (313_4, 313_5) from the selected first available slot (313_3), if all n−1 consecutive slots (313_4, 313_5) are available, for transmission of data of the particular transmission type. The data is transmitted over an optical network comprising a plurality of nodes (305, 327) interconnected by optical sections (301, 309, 329, 331) the nodes (305, 327) supporting a plurality of transmission types, wherein transmission of data of the particular transmission type requires a predetermined number n of consecutive slots. Alternatively the slots may be divided in groups (333, 335, 337) and slots are allocated to a group in which all slots are available.

6 Claims, 5 Drawing Sheets

(56) References Cited

U.S. PATENT DOCUMENTS

| | | | |
|---|---|---|---|
| 2004/0220886 A1* | 11/2004 | Kumaran | G06Q 30/0283 |
| | | | 705/400 |
| 2007/0206946 A1* | 9/2007 | Beshai | H04Q 11/0005 |
| | | | 398/4 |
| 2011/0228832 A1* | 9/2011 | De Francisco Martin | H04W 72/02 |
| | | | 375/224 |

OTHER PUBLICATIONS

S. Gringeri, et al., "Flexible architectures for optical transport nodes and networks", IEEE Communications Magazine. IEEE Service Center. Piscataway. US. vol. 48. No. 7. Jul. 1, 2010 pp. 40-50, XP011312222.

N. Sambo, et al., "Distributed Setup in Optical Networks with Flexible Grid", ECOC Technical Digest, Sep. 18, 2011, pp. 1-3, XP002676471.

S. Thiagarajan, et al "Spectrum efficient super-channels in dynamic flexible grid networks—A blocking analysis", Optical Fiber Communication Conference.2011. Technical Digest, OFC/NFOEC, IEEE. Mar. 6, 2011, pp. 1-3. XP031946532.

Office Action issued on Jul. 13, 2016 in corresponding European Application No. 11 793 788.8, 7 pages.

\* cited by examiner

METHOD AND APPARATUS FOR ALLOCATING SLOTS FOR TRANSMISSION OF DATA

CROSS REFERENCE TO RELATED APPLICATION(S)

This application is a 35 U.S.C. §371 National Phase Entry Application from PCT/EP2011/072117 filed Dec. 7, 2011, which claims priority to European application no. 11181653.4 filed on Sep. 16, 2011. The above identified applications are incorporated by reference in their entirety.

FIELD OF THE INVENTION

The present invention relates to a method and apparatus for allocating slots for transmission of data. In particular, but not exclusively, it relates to allocating slots for transmission of data over an optical network and gathering information as to the availability of slots in such a network.

BACKGROUND TO THE INVENTION

Optical networks, such as for example, distributed Wavelength Switched Optical Networks (WSONs) support end-to-end optical paths, called lightpaths, between nodes requiring connection in the network. Intermediate nodes in this type of network support wavelength switching and may also support wavelength conversion. Establishing routes over such a network is constrained by the availability of wavelengths. This is typically addressed by resorting to the Label Set (LS) Generalized Multi-Protocol Label Switching (GMPLS) object, which collects wavelength availability information during the signalling phase of the lightpath setup process. The recent availability of flexible optical cross-connects prototypes is driving the introduction of flexible grids, i.e. frequency slots of reduced width (e.g., 6.25 GHz or 12.5 GHz) which need to be reserved in a contiguous way according to the number of frequency slots required by the lightpath.

In flexible grid network scenarios, traditional wavelength assignment strategies have been established. One such known strategy is known as "first-fit". This wavelength assignment strategy assigns a first available frequency slot for a data transmission or at least a first available contiguous number of required slots for data transmission. However, such a strategy may not guarantee efficient network resource utilization because of the different granularity of the requests.

Moreover, the evolution of the GMPLS protocol to cope with frequency slots rather than wavelengths is not straightforward since it may determine scalability problems. For instance, regarding Resource Reservation Protocol-Traffic Engineering (RSVP-TE) signalling protocol, while the typical size of LS refers to 40 or 80 wavelengths, in flexible grid scenarios, the number of frequency slots is significantly high, e.g. 320 or 640 with slot widths of 12.5 or 6.25 GHz respectively.

SUMMARY OF INVENTION

The present invention seeks to obviate at least some of the disadvantages of the prior art systems and provide an improved method and apparatus for allocating slots for transmission of data.

This is achieved, according to first aspect of the present invention, by a method of allocating slots for transmission of data of a particular transmission type over an optical network. The optical network comprises a plurality of nodes which are interconnected by optical sections. The nodes support a plurality of transmission types. The transmission of data of a particular transmission type requires a predetermined number n of consecutive slots. A first available slot is selected at an ordinal position corresponding to a multiple of n. This selected first available slot and the next n−1 consecutive slots from the selected first available slot are allocated, if all n−1 consecutive slots are available, for transmission of data.

This is also achieved, according to a second aspect of the present invention, by apparatus for allocating slots for transmission of data of a particular transmission type over an optical network. The optical network comprises a plurality of nodes which are interconnected by optical sections. The nodes support a plurality of transmission types. The transmission of data of a particular transmission type requires a predetermined number n of consecutive slots. The apparatus comprises a processor operable to select a first available slot at a location corresponding to a multiple of n and to allocate the next n−1 consecutive slots from the selected slot, if available, for transmission of data of the particular transmission type.

In this way, an efficient slot assignment strategy during lightpath setup is achieved which depends on the transmission type (value of n) i.e. the adopted transmission type (or modulation format) and bit-rate and, therefore, provides more effective slot selection strategies enabling use of Generalized Multi-Protocol Label Switching (GMPLS) for flexible grids.

This is also achieved, according to a third aspect of the present invention, by a method of allocating slots for transmission of data of a particular transmission type over an optical network. The optical network comprises a plurality of nodes interconnected by optical sections. The nodes support a plurality of transmission types. The transmission of data of the particular transmission type requires a predetermined number n of consecutive slots. The slots are divided into a plurality of grouped slots. Each group of slots comprises the predetermined number n of consecutive slots. The slots in a group, in which all slots of the group are available, are allocated for transmission of data.

This is also achieved, according to a fourth aspect of the present invention, by apparatus for allocating slots for transmission of data of a particular transmission type over an optical network. The optical network comprises a plurality of nodes interconnected by optical sections. The nodes support a plurality of transmission types. The transmission of data of the particular transmission type requires a predetermined number n of consecutive slots. The slots are divided into a plurality of grouped slots. Each group of slots comprises the predetermined number n of consecutive slots. The apparatus comprises a processor operable to allocate a group of slots for transmission of data in which all slots are available.

In aggregating slot availability information during lightpath setup (indicating availability and allocated slots in terms of groups) overcomes scalability issues by limiting the amount of information carried by the Label Set (LS) without impacting lightpath blocking probability. The methods and apparatus above are suitable for the current GMPLS protocol suite, without requiring any additional extension and, therefore, provides more effective slot selection strategies enabling use of Generalized Multi-Protocol Label Switching (GMPLS) for flexible grids.

This is also achieved, according to another aspect of the present invention, by a method and apparatus of obtaining slot availability information in an optical network. The optical network comprises a plurality of nodes interconnected by optical sections for transmission of data of a particular transmission type. The nodes support a plurality of transmission types. The transmission of data of the particular transmission type requires a predetermined number n of consecutive slots. The slots for transmissions are divided into a plurality of grouped slots. Each group of slots comprises the predetermined number n of consecutive slots. The group in which all slots are available is indicated as available.

This is also achieved, according to another aspect of the present invention, by an optical network which comprises a plurality of nodes. The nodes support a plurality of transmission types. Transmission of data of a particular transmission type requires a predetermined number n of consecutive slots. At least one node comprises a source node and at least one other node comprises a destination node. The network further comprises at least one optical section connected by the plurality of nodes wherein the destination node sends a reservation message to establish a path for transmission of data of a particular transmission type from the source node to the destination node via the at least one optical section. The destination node comprises a processor operable to select a first available slot at an ordinal position corresponding to a multiple of n; and to allocate the next n−1 consecutive slots from the selected first available slot, if all of the n−1 slots are available, for transmission of data of a particular transmission type.

This is also achieved, according to yet another aspect of the present invention, by an optical network which comprises a plurality of nodes. The nodes support a plurality of transmission types. Transmission of data of a particular transmission type requires a predetermined number n of consecutive slots. At least one node comprises a source node and at least one other node comprises a destination node. The network further comprises at least one optical section connected by the plurality of nodes. The destination node sends a reservation message to establish a path for transmission of data of a particular transmission type from the source node to the destination node via the at least one optical section. The destination node comprises a processor operable to divide the slots for transmissions into a plurality of grouped slots, each group of slots comprising the predetermined number n of consecutive slots; and to allocate slots in a group, of slots in which all slots are available, for transmission of data.

BRIEF DESCRIPTION OF DRAWINGS

For a more complete understanding of the present invention, reference is now made to the following description taken in conjunction with the accompanying drawings in which.

DETAILED DESCRIPTION OF EMBODIMENTS OF THE INVENTION

Figure 1:
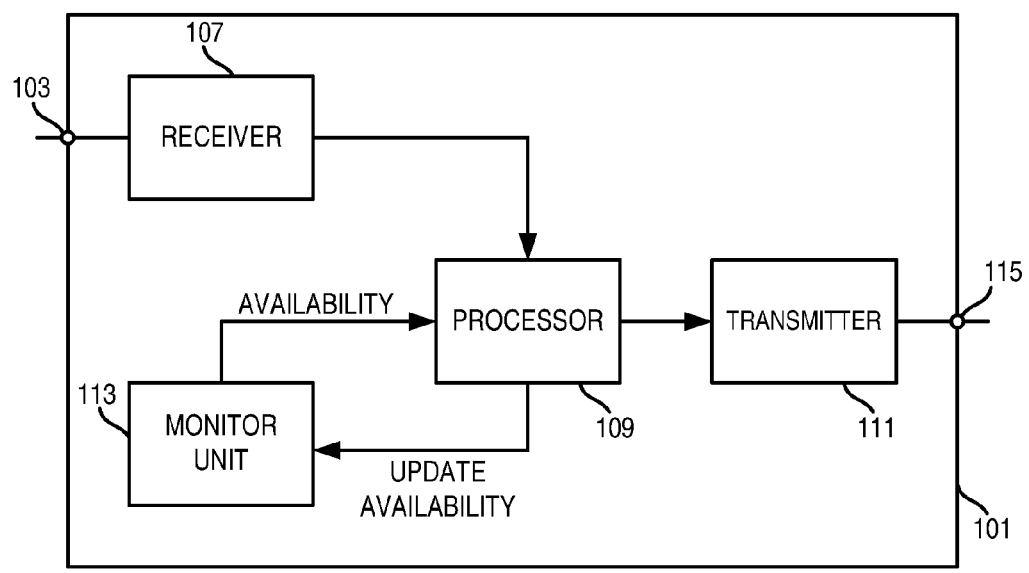
FIG. 1 is a simplified schematic of apparatus for allocating slots according to an embodiment of the invention.

FIG. 1 illustrates apparatus 101 for allocating slots for transmission of data across an optical network. The optical network comprises a plurality of nodes interconnected by optical sections in which data is communicated bi-directionally, such as, for example, a Wavelength Switched Optical Network (WSON). The apparatus 101 comprises an input terminal 103, a receiver 107, a processor 109, a monitor unit 113, a transmitter 111 and an output terminal 115 and may form a component of the nodes of the optical network.

At least one of the nodes of the optical network comprises a source node in which the input terminal of the node is connected to an external source of data and at least one node comprises a destination node in which the output terminal of the node is connected to an external destination. There may be any number of intermediate nodes connected therebetween such that the input terminal of each intermediate node is connected to the output terminal of a previous node in the transmission path and the output terminal of each intermediate node is connected to the input terminal of a subsequent node in the transmission path. The source node sets up a path to the destination node. Allocation of slots is determined at the destination node and intermediate nodes update the availability of slots and inform the destination node of the slots available. The intermediate nodes within the path are "transparent".

In an embodiment, the optical sections (or links) between these nodes supports S=320 slots of bandwidth B=12.5 GHz. The nodes of the embodiment support transmission and reception at a bit-rate of 100, and 400 Gb/s. It can be appreciated that the present invention is equally applicable to networks having differing slot and bandwidth capabilities and differing bit-rates to these specified here with respect to the embodiments of the present invention.

Depending on the bit-rate and transmission type (modulation format), n consecutive frequency slots are required for such a lightpath (for transmission of the data). For example, a bit-rate of 100 Gb/s and a transmission type of dual polarization quadrature phase shift keying (DP-QPSK) and coherent detection requires 28 GHz (covered by 3 slots). In another example, a bit-rate of 400 Gb/s and a transmission type of DP- and quadrature amplitude modulation (QAM), i.e. 64-QAM, 16-QAM, or 4-QAM, and coherent detection requires 37 GHz (3 slots), 56 GHz (5 slots), and 112 GHz (9 slots), respectively. These requirements are set out in T. Pfau, "Hardware requirements for coherent systems beyond 100G," in ECOC 2009.

In addition to the specification of the different number of slots required for different transmission types (modulation formats), the several modulation formats also require a different minimum Optical Signal Noise Ratio (OSNR) to have a target Bit Error Rate (BER). For instance, to have a BER lower than $10^{-3}$, 64-QAM, 16-QAM, and 4-QAM require at least 24.3 dB, 20.1 dB, 16.3 dB of OSNR, respectively, as described by T. Pfau, "Hardware requirements for coherent systems beyond 100G," in ECOC 2009. The node performs path computation (e.g., source node or Path Computation Element) and is aware of physical layer information. Thus, the node is able to assess if a specific path has acceptable quality of transmission (QoT) given the bit-rate and the modulation format.

Upon receipt of a lightpath and bit-rate request, a path connecting the source node and the destination node is computed. The number of required frequency slots to serve the requested bit-rate with the best performance (in terms of bandwidth) available modulation format guaranteeing the QoT (e.g., assuming that both 64-QAM and 16-QAM guarantees the QoT along the transmission path for a 400 Gb/s request, 64-QAM will outperform 16-QAM because the former requires 3 slots and the latter 5).

According to the signalling based on Resource Reservation Protocol-Traffic Engineering (RSVP-TE), slot availability information can be gathered within the Label Set (LS) object. If slots are treated similarly as wavelengths, LS object carries an identifier of each slot available in each link of the path. The LS object is maintained within the monitor unit 113 of the apparatus 101 of each node along the computed path. In the example above, the number of elements in the LS object is up to 320 identifiers (for each of the 320 slots) if the grid spacing is 12.5 GHz (bandwidth). The apparatus 101 of each intermediate node receives the LS object from the previous node along the path of that node on the input terminal 103. Each intermediate node updates the LS object within the monitor unit 113 of the apparatus 101 by removing the identifier of the slots which are unavailable in the outgoing link for that node. This is described in more detail below.

Figure 2A:
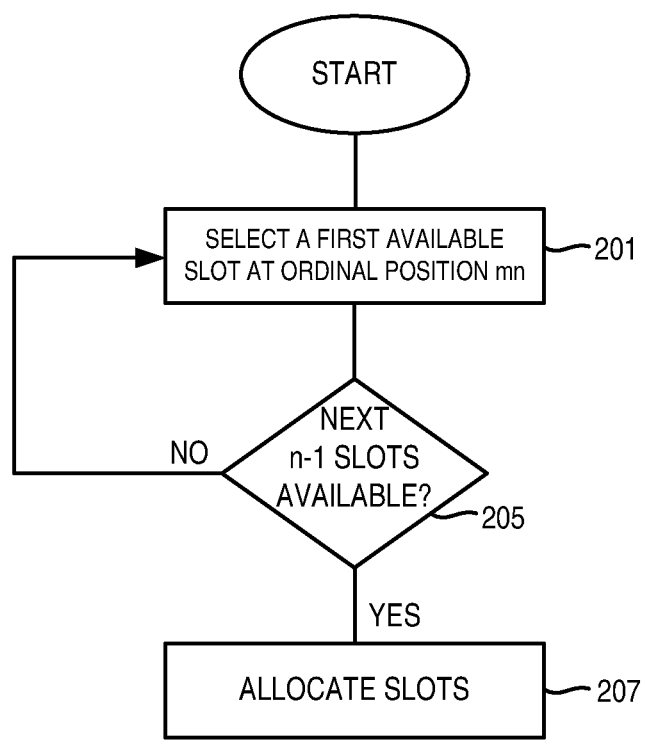
FIG. 2(a) is a flowchart of a method of an embodiment of the invention.
Figure 3A:
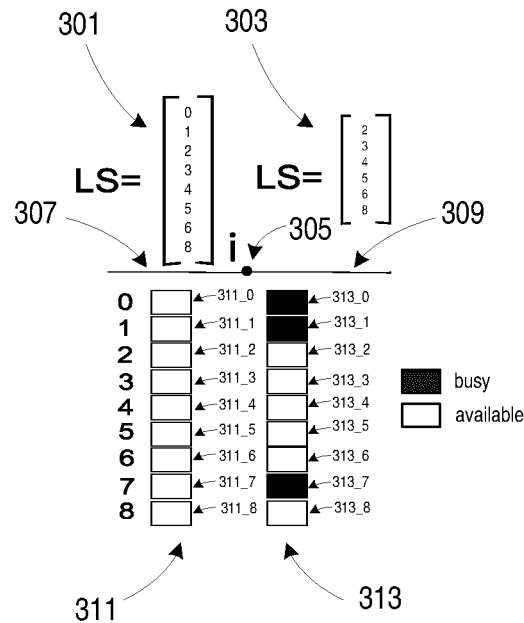
FIGS. 3(a) and (b) illustrate the label sets of the embodiments of FIGS. 2(a) and (b), respectively.

In an embodiment as shown in FIGS. 2(a) and 3(a), a path is computed via intermediate node 305. The intermediate node 305 has an incoming link 307 and an outgoing link 309 to form a part of the computed path as shown in FIG. 3(a). The computed path may comprise any number of intermediate nodes as required to transmit data from a source node to a destination node. Each of the intermediate nodes, source node and destination node of the computed path comprise the apparatus 101 as shown in FIG. 1 and described above.

The apparatus 101 of each intermediate node 305 receives at the input terminal 103, and hence the receiver 107, data for transmission along the computed path. It also receives the corresponding LS object 301. The LS object is forwarded to the processor 109 which assesses the number (n) of slots required for data transmission and the slots available for the outgoing link 309 from the availability of slots indicated by the received LS object 301 (slots 311_0 to 311_8 as shown by the slots 311). The received LS object 301 is updated by the monitor unit 113 according to the slots allocated by the processor 109 and transmitted with the data, via the output terminal 115.

In the specific example illustrated in FIG. 3(a), a transmission type is 64-QAM with a bit-rate of 400 Gb/s giving, n=3. According to the received LS object 303 at the intermediate node 305, slots 313_0, 313_1 and 313_7 of the slots 313 are indicated as busy. The particular allocation of slots illustrated in FIG. 3(a) is for illustrative purposes only. At the destination node, n=3 consecutive slots are required by the specific modulation format and bit-rate of this example. These are selected as follows:

The first available slot at an ordinal position which is a multiple of n (the multiple including 0) indicated by the received LS object is determined by the processor 109 at the destination. In the example, shown in FIG. 3(a), the first available slot is determined at the second ordinal position (mn, 1×3), i.e. the fourth slot 313_3 since the slot at the first ordinal position (mn, 0×3), i.e. first slot 313_0 is unavailable on the outgoing link 309, LS object 303. Therefore, the first available slot is considered to be the slot at the lowest ordinal position which is available. This slot is selected, steps 201. Next it is established if the next n−1 (3−1=2) slots 313_4, 313_5 are available, step 205. In the example shown in FIG. 3(a) these are available and these n slots 313_3, 313_4, 313_5 are reserved, i.e. allocated, step 207. This updated allocation is provided to the monitor unit 113 which updates the LS object 303. The data is transmitted in slots 313_3, 313_4, 313_5 of slots 313 via the transmitter 111 and output terminal 115 onto the outgoing link 309. In respect of the prior art "first-fit" (FF) strategy, the slots 311_2, 311_3, 311_4 would have been allocated.

The method above operates on detailed slot availability information within the LS object. An equivalent slot selection output can be obtained if slot availability information is divided into a plurality of groups of slots (i.e. the slot availability information is grouped) depending on the number of slots required by the lightpath. This is illustrated in the alternative embodiment of FIGS. 2(b) and 3(b).

In this embodiment, the slots 325, 326 are divided into groups 333, 335, 337, of a predetermined, equal number of slots. The number (n) of slots within each group corresponds to the number of slots required for a particular transmission type and bit-rate. Therefore, for the example above, n=3, the slots are divided into groups of 3 consecutive slots. In particular, the slots are divided into consecutive groups of 3 consecutive slots. As a result there are no slots available in between any one group.

The slots are then allocated to available groups, steps 211, 213. The LS object 321, 323 then carries the group-identifier only, instead of the identifier for each slot. The apparatus 101 of each intermediate node, receives the LS object, which provides identifiers of the groups which contains available slots in the outgoing link. For example, in FIG. 3(b), the computed path includes an intermediate node 327 with an incoming link 329 and an outgoing link 331. The LS object 321 received by the intermediate node 327 indicates that the groups 333, 335, 337 of the slots are available. The LS object 321 is provided to the monitor unit 113 which updates the LS object. The LS object is updated by removing groups 333 and 337 which are unavailable in link 331 (see slots 326).

Figure 2B:
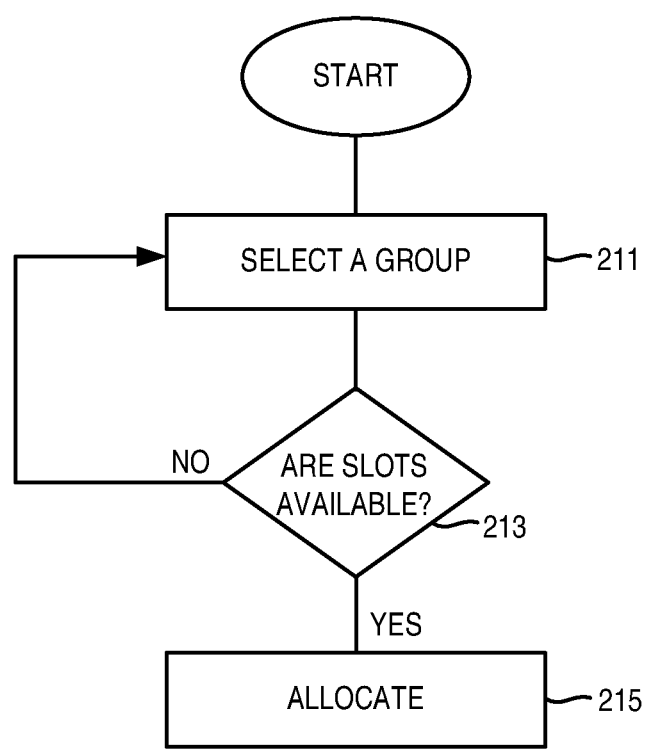
FIG. 2(b) is a flowchart of a method of an alternative embodiment of the invention.

At the destination, the processor performs the slot assignment by selecting the group of n slots with a first-fit policy (i.e., the lowest-indexed available group) or, alternatively, as illustrated in FIG. 2(b), the first group is selected and if not available the next is select until a first available group is found, steps 211, 213. In the specific example of FIG. 3(b), the group 335 is selected and allocated for transmission.

Figure 3B:
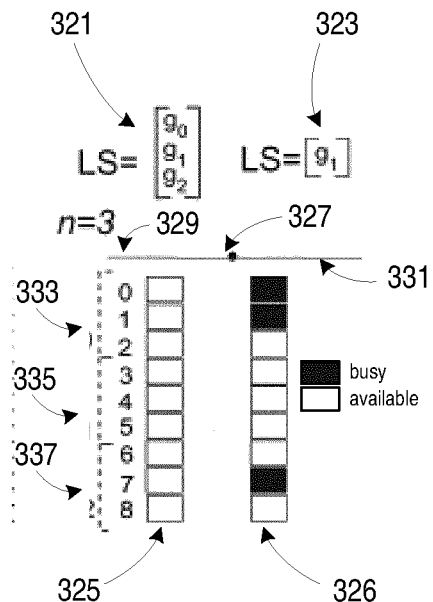

The embodiment of FIGS. 2(a) and 3(a) will be referred to as the "Multi-n" slot allocation strategy and the embodiment of FIGS. 2(b) and 3(b) will be referred to as the "AggrFF" slot allocation strategy.

Figure 4:
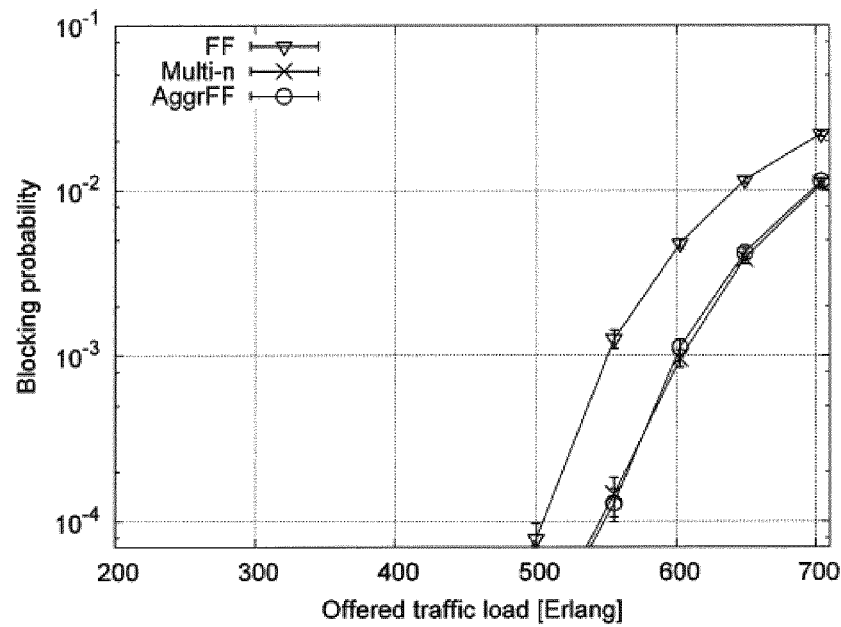
FIG. 4 is a graph representing a comparison of the blocking probability of the prior art and the embodiment of FIGS. 2(a) and (b).

FIG. 4 shows the blocking probability vs. the offered traffic load of different slot allocation strategies, namely, the prior art "first-fit" strategy (FF), the strategy of the embodiments of FIGS. 2(a) and 3(a) "Multi-n" strategy (Multi-n) and the strategy of the embodiment of FIGS. 2(b) and 3(b) "AggrFF" strategy (AggrFF). The blocking probability is the probability that a data transmission will be blocked due to unavailability of slots. As generally indicated by FIG. 4, blocking increases with traffic load for all the strategies since resources are more occupied and LS objects do not reach destination, blocking the path. However, it is clear from FIG. 4 that both Multi-n and AggrFF outperforms FF, since with FF a large number of free adjacent slots cannot be selected because these are less than n. Indeed, by analyzing simulations, it was observed that groups of up to 8 consecutive slots are often free with FF, thus enabling the setup of 100 Gb/s and 16- and 64-QAM 400 Gb/s, but preventing the setup of 4-QAM 400 Gb/s. On the contrary, Multi-n and AggrFF obtain a better performance than FF since nine adjacent available slots are more likely to be found. As expected, by observing AggrFF and Multi-n, they obtain the same blocking probability given that they provide the same slot selection output.

Figure 5:
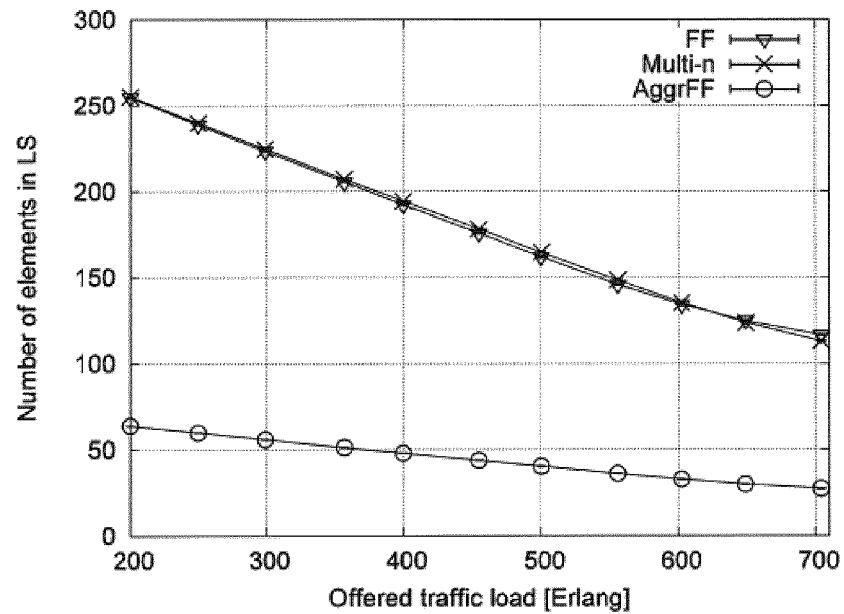
FIG. 5 is a graph representing a comparison of the number of label set elements of the prior art and the embodiment of FIGS. 2(a) and (b).

FIG. 5 shows the average number of elements in the LS object received at destination node vs. the offered traffic load. Generally, the number of elements in LS object decreases while the traffic load increases, since a smaller amount of slots will be available in the links and, consequently, a higher amount of elements are removed from LS object. AggrFF reduces by up to 80% (at traffic loads of 200 and 700) the number of elements in LS object with respect to Multi-n and FF. Thus, AggrFF reduces the amount of control plane information carried during lightpath setup keeping a lightweight control plane. In particular, with AggrFF, instead of carrying hundreds of elements, the LS object carries an amount of elements which is comparable with the amount of elements carried in currently deployed Wavelength Switched Optical Networks (WSONs). Further AggrFF obtains low blocking probability as shown in FIG. 4.

The comparisons of FIGS. 4 and 5 were achieved by evaluation through a custom C++ event-driven simulator on the Spanish network with number of nodes, E=30, number of optical sections, V=56, number of slots, S=320. Lightpath QoT is considered to be acceptable (BER<$10^{-3}$ before forward error correction) as described in T. Pfau, "Hardware requirements for coherent systems beyond 100G," in ECOC 2009 for 400 and 100 Gb/s, respectively. Lightpath requests are uniformly distributed among s-d pairs and bit-rates. Inter-arrival and holding times are exponentially distributed with an average of $1/\lambda$ and $1/\mu=500$ s, respectively. Traffic load is expressed as $\lambda/\mu$.

Although the embodiments above illustrate a particular transmission type of the 64-QAM and a transmission rate of 400 Gb/s, n=3, it can be appreciated that the embodiments are suitable for different transmission rates (bit-rates) and transmission types (modulation formats) in flex-grid WSONs with path computation either centralized (PCE) or distributed (performed by the source node).

Although embodiments of the present invention have been illustrated in the accompanying drawings and described in the foregoing detailed description, it will be understood that the invention is not limited to the embodiments disclosed, but is capable of numerous modifications without departing from the scope of the invention as set out in the following claims.

The invention claimed is:

1. A method of allocating frequency slots for transmission of data over an optical network, wherein the transmission of the data requires a predetermined number n of consecutive frequency slots, the method comprising:
   receiving a Label Set (LS) object identifying a plurality of available frequency slots and identifying which of said plurality of consecutive frequency slots are available and which are not available;
   selecting a first available frequency slot at an ordinal position corresponding to a multiple of n;
   determining from information in the LS object that at least one of the next n−1 consecutive frequency slots from the selected first available frequency slot is not available;
   selecting a next available frequency slot at an ordinal position corresponding to a multiple of n as a result of determining that at least one of the next n−1 consecutive frequency slots from the selected first available frequency slot is not available;
   determining from information included in the LS object whether the next n−1 consecutive frequency slots from the selected next available frequency slot are available;
   in response to determining that the next n−1 consecutive frequency slots from the selected next available frequency slot are available, allocating for transmission of data the selected next available frequency slot and the n−1 frequency slots that immediately follow the selected next available frequency slot;
   modifying the LS object so that the modified LS object indicates that the frequency slots allocated for transmission of the data are not available; and
   transmitting the modified LS object.

2. The method according to claim 1, wherein the value of n is predetermined from a modulation format of the data and a transmission rate required to achieve a target bit error rate.

3. An apparatus for allocating frequency slots for transmission of data of a particular transmission type over an optical network, wherein transmission of data of the particular transmission type requires a predetermined number n of consecutive frequency slots, the apparatus comprising:
   a transmitter;
   a receiver for receiving a Label Set (LS) object identifying a plurality of available frequency slots and identifying which of said plurality of consecutive frequency slots are available and which are not available; and
   a processor coupled to the transmitter and the receiver, wherein the processor is configured to:
   select from a set of N consecutive frequency slots a first selected frequency slot, wherein N>n; and
   determine from information included in the LS object whether the first selected frequency slot is available, wherein
   the processor is further configured such that, as a direct result of, and in response to, determining that the first selected frequency slot is not available, the processor: selects from the set of N consecutive frequency slots a second selected frequency slot, wherein, within the set of N consecutive frequency slots, the number of consecutive frequency slots that are positioned between the second selected frequency slot and the first selected frequency slot is n−1; and determines whether the second selected frequency slot is available,
   the processor is further configured such that, as a direct result of, and in response to, determining that the first selected frequency slot is available, the processor determines from information included in the LS object whether each of the n−1 consecutive frequency slots that immediately follow the first selected frequency slot are available,
   the processor is further configured such that the processor allocates for the transmission of the data the first selected frequency slot and each of the n−1 consecutive frequency slots that immediately follow the first selected frequency slot as a result of determining that the first selected frequency slot and each of the n−1 consecutive frequency slots that immediately follow the first selected frequency slot are available,
   the processor is further configured to modify the LS object so that the modified LS object indicates that the allocated frequency slots are not available, and
   the processor is further configured to employ the transmitter to transmit the modified LS object.

4. The apparatus according to claim 3, wherein the processor is further configured to monitor frequency slots available for transmission.

5. A method of selecting n number of consecutive frequency slots for transmission of data over an optical network, wherein n is greater than 1, the method comprising:
  receiving a Label Set (LS) object identifying a set of N consecutive frequency slots, wherein N is greater than n, and identifying which of said N consecutive frequency slots are available and which are not available;
  selecting for allocation n of said N consecutive frequency slots, wherein selecting said n available frequency slots comprises:
  (a) selecting from the set of N consecutive frequency slots a first selected frequency slot;
  (b) determining from information included in the LS object that the first selected frequency slot is unavailable; and
  (c) as a direct result of, and in response to, determining that the first selected frequency slot is unavailable:
    (c1) selecting from the set of N consecutive frequency slots a second selected frequency slot, wherein, within the set of N consecutive frequency slots, the number of consecutive frequency slots that are positioned between the second selected frequency slot and the first selected frequency slot is n−1; and
    (c2) determining from information included in the LS object whether the second selected frequency slot is available;
  modifying the LS object so that the modified LS object indicates that the frequency slots selected for allocation are not available; and
  transmitting the modified LS object.

6. The method of claim 5, further comprising:
  (d) as a result of determining that the second selected frequency slot is available, determining whether all of the n−1 consecutive frequency slots that immediately follow the second selected frequency slot are available;
  (e) as a direct result of, and in response to, determining that at least one of said n−1 consecutive frequency slots that immediately follow the second selected frequency slot is not available, selecting from the set of N consecutive frequency slots a third selected frequency slot, wherein, within the set of N consecutive frequency slots the number of consecutive frequency slots that are positioned between the third selected frequency slot and the second selected frequency slot is n−1;
  (f) determining whether the third selected frequency slot is available;
  (g) as a direct result of, and in response to, determining that the third selected frequency slot is available, determining whether all of the n−1 consecutive frequency slots that immediately follow the third selected frequency slot are available; and
  (h) as a direct result of, and in response to, determining that all of said n−1 consecutive frequency slots that immediately follow the third selected frequency slot are available, allocating for the transmission of the data the third selected frequency slot and said n−1 consecutive frequency slots that immediately follow the third selected frequency slot.

* * * * *